(12) United States Patent
Ido

(10) Patent No.: US 6,992,522 B2
(45) Date of Patent: Jan. 31, 2006

(54) NEGATIVE VOLTAGE BOOSTING CIRCUIT

(75) Inventor: Masamichi Ido, Kawasaki (JP)

(73) Assignee: Nec Electronics Corporation, (JP)

( * ) Notice: Subject to any disclaimer, the term of this patent is extended or adjusted under 35 U.S.C. 154(b) by 0 days.

(21) Appl. No.: 10/080,194

(22) Filed: Feb. 19, 2002

(65) Prior Publication Data

US 2002/0118059 A1    Aug. 29, 2002

(30) Foreign Application Priority Data

Feb. 26, 2001    (JP)    ............... 2001-050813

(51) Int. Cl.
G05F 3/24    (2006.01)
(52) U.S. Cl. .................... 327/536; 327/537; 363/60
(58) Field of Classification Search ............... 327/536, 327/537; 365/189.09; 363/60
See application file for complete search history.

(56) References Cited

U.S. PATENT DOCUMENTS 5,694,072 A * 12/1997 Hsiao et al. ............... 327/536
5,812,018 A * 9/1998 Sudo et al. ................ 327/536
5,982,224 A * 11/1999 Chung et al. .............. 327/536
6,163,487 A * 12/2000 Ghilardelli ................ 327/536
6,175,264 B1 * 1/2001 Jinbo ....................... 327/536
6,720,822 B2 * 4/2004 Torrisi et al. .............. 327/536

FOREIGN PATENT DOCUMENTS

JP    11-265593    9/1999

* cited by examiner

Primary Examiner—My-Trang Nu Ton
Assistant Examiner—Terry L. Englund
(74) Attorney, Agent, or Firm—Hayes Soloway P.C.

(57) ABSTRACT

In a negative voltage boosting circuit in which a plurality of boosting unit circuits for boosting negative voltage are connected in series between the input and output terminals of the negative boosting circuit for generating negative voltage at the output terminal. Each of such circuits includes a MOS transistor for transferring charge having one of either the source or the drain connected to an input terminal of the boosting circuit and the other of the source or the drain connected to an output terminal of the boosting circuit. At least one MOS transistor has a well region forming a channel region of the MOS transistor for transferring charge. The well region is biased by electric potential at the output terminal of another boosting unit circuit in an output direction from the biased boosting unit circuit.

14 Claims, 13 Drawing Sheets

US 6,992,522 B2

NEGATIVE VOLTAGE BOOSTING CIRCUIT

BACKGROUND OF THE INVENTION

1. Field of the Invention

The present invention relates to a negative voltage boosting circuit, particularly relates to a negative voltage boosting circuit using a MOS transistor for a switch for transferring charge.

2. Description of the Prior Art

Recently, electrically writable EEPROM and a flash memory have been used for multiple equipment such as a mobile telephone. In writing or erasing data to/in these memories, negative high voltage is generally required. As it economically increases the cost to mount negative high voltage power supply in equipment separately from a power source that outputs positive voltage, a method of generating negative high voltage from a single power source using a negative voltage boosting circuit is widely adopted.

A conventional example of such a negative voltage boosting circuit is disclosed in Japanese published unexamined patent application No. Hei 11-265593 and if the negative voltage boosting circuit disclosed in the patent application is described referring to FIGS. 9 to 11, FIG. 9 shows a circuit disclosed in the patent application, and FIG. 10 are a sectional view showing the structure of an N-type MOS transistor MN4 forming a boosting unit circuit CP4 and a wiring diagram showing connection relation among each terminal of the N-type MOS transistors MN4, P-type diffused layers 2 and 5 and N-type diffused layers 3 and 4.

FIG. 11 shows each signal waveform of clock signals for driving the negative voltage boosting circuit shown in FIG. 9, output voltage VPN from junction points A4, A5 and A41 and an output terminal Out, the channel current I1 of the N-type MOS transistor MN4, the base current I2 and the collector current I3 of a parasitic bipolar transistor.

The negative voltage boosting circuit shown in FIG. 9 includes a boosting unit circuit CP0 formed by an N-type MOS transistor MN0 the input terminal IN of which is connected to ground potential GND and five boosting unit circuits CP1 to CP5 formed by each combination of each N-type MOS transistor MN1 to MN5 and each N-type MOS transistor MN11 to MN51 and each combination of each capacitative element C1 to C5 and each capacitative element C11 to C51, and generates the output voltage VPN of the negative voltage boosting circuit at the output terminal Out of the last boosting unit circuit CP5.

Diodes D0 to D5 shown in FIG. 9 denote each parasitic-diode caused by a pn junction between a P-type well 8 in which each source and each drain of each N-type MOS transistor MN0 to MN5 are formed and an N-type well 9 in which the P-type well 8 is formed as shown in FIG. 10, and the N-type well 9 is biased by a power source Vcc respectively via the N-type diffused layers 1 and 6.

The N-type MOS transistors MN0 to MN 5 and the N-type MOS transistors MN11 to MN51 have the similar structure as a structural sectional view of the N-type MOS transistor MN4 is shown as an example in FIG. 10, and the source and the drain of each N-type MOS transistor are formed in the P-type well 8 separately from a P-type semiconductor substrate 10 so that the P-type well 8 is included in the N-type well 9 formed in the P-type semiconductor substrate 10.

The source of the N-type MOS transistor MN0 forming the boosting unit circuit CP0 is connected to the ground potential GND via an input terminal IN, the drain is connected in common to its own gate electrode and the P-type well 8 to be its own channel region and further, is connected to a junction point A1 which functions as an output terminal of the boosting unit circuit CP0.

In the boosting unit circuit CP1 connected next to the boosting unit circuit CP0, the source which functions as an input terminal of the N-type MOS transistor MN1 and the gate of the N-type MOS transistor MN11 are connected to the output terminal of the boosting unit circuit CP0, the drain of the N-type MOS transistor MN1 and the P-type well to be its own channel region are connected, further, the drain of the N-type MOS transistor MN11 and the P-type well to be a channel region of the N-type MOS transistor MN11 are connected in common and are connected to a junction point A2 which functions as an output terminal of the boosting unit circuit CP1.

One end of the capacitative element C1 is also connected to the junction point A1 which functions as the input terminal of the boosting unit circuit CP1 and a clock signal CK1 is applied to the other end of the capacitative element C1. One end of the capacitative element C11 is connected to the gate of the N-type MOS transistor MN1 and a clock signal CK3 is applied to the other end of the capacitative element C11.

The residual other boosting unit circuits CP2 to CP5 are also formed by the similar configuration, however, a clock signal supplied to the capacitative elements C1 to C5 and C11 to C15 is input so that the phase is reverse to the phase of the adjacent boosting unit circuit. That is, a clock signal CK1 and a clock signal CK2 are out of phase, and a clock signal CK3 and a clock signal CK4 are out of phase.

Next, the operation of the conventional type negative voltage boosting circuit shown in FIG. 9 will be described referring to FIG. 11.

FIG. 11 shows signal waveforms of voltage and current in case the vertical axis shows voltage or current and the horizontal axis shows time, and shows each signal waveform of clock signals CK1, CK2, CK3 and CK4, each voltage at the junction points A4, A5 and A41 and voltage VPN at the output terminal, the channel current of the N-type MOS transistor MN4, the base current I2 and the collector current I3 of a parasitic NPN transistor composed of the N-type diffused layer 3 which functions as an emitter, the P-type well 8 which functions as a base and the N-type well 9 which functions as a collector respectively shown in FIG. 10.

In the following operational explanation, to simplify the description, only the boosting unit circuit CP4 will be described in behalf of the other boosting unit circuits below. Before time t1, a clock signal CK2 is at a VCC level and at this time, electric potential at the junction point A4 is raised up to a level at which the N-type MOS transistor MN41 conducts via the capacitative element C4. When a clock signal CK1 becomes at a high level at time t2, electric potential at the junction point A5 is raised via the capacitative element C5. At this time, charge is supplied from an input terminal for a clock signal CK1 to be input to the junction point A41 via the N-type MOS transistor MN41 and electric potential at the junction point A41 of the gate of the N-type MOS transistor MN4 rises.

Next, at time t3, a clock signal CK2 becomes at a low level, negative pulse current flows to the junction point A4 via the capacitative element C4 and electric potential at the junction point A4 drops. At that time, a pn junction connected to the junction point A5 and the junction point A4 as shown in FIG. 10 is forward-biased, current I2 flows from the P-type diffused layers 2 and 5 to the N-type diffused layer 3, soon afterward, as positive pulse current flows to the gate of the N-type MOS transistor MN4 via the capacitative element C41 when a clock signal CK4 becomes at a high level at time t4, the gate potential of the N-type MOS transistor MN4 further rises, the N-type MOS transistor MN4 conducts enough and channel current I1 flows from the junction point A5 to the junction point A4. When this operation is sequentially repeated in each boosting unit circuit CP0 to CP5, the potential of output voltage VPN from the output terminal Out drops for example every cycle of a clock signal as shown in FIG. 11 and after predetermined time, the potential becomes negative fixed potential (−13 V).

In the above-mentioned conventional type negative voltage boosting circuit, when electric potential at the junction point A4 at the time t3 becomes lower than electric potential at the junction point A5, the P-type well 8 and the N-type diffused layer 3 are forward-biased and forward current I2 in the pn junction flows from the P-type diffused layers 2 and 5 to the N-type diffused layer 3 as base current as shown in FIG. 10. Therefore, collector current I3 acquired by multiplying the forward current I2 by a grounded emitter current amplification factor hfe flows from the N-type well 9 biased at VCC potential to the junction point A4.

Next, to continue the description referring to FIG. 12 showing voltage at the junction points of the conventional type negative voltage boosting circuit, channel current I1, the base current I2 and the collector current I3 of a parasitic NPN transistor, as the capacitative element connected to the junction point A4 is charged by the collector current I3 as shown at t3 and t4 in FIG. 12, electric potential which is to be dropped at the junction point A4 rises, voltage between the N-type diffused layer 4 (the drain) and the N-type diffused layer 3 (the source) decreases, therefore, channel current I1 which flows from the N-type diffused layer 4 (the drain) to the N-type diffused layer 3 (the source) decreases and boosting efficiency is deteriorated.

To explain more concretely, in case the grounded emitter current amplification factor hfe of the parasitic NPN transistor composed of the N-type diffused layer 3 which functions as an emitter and the N-type well 9 which function as a collector is small, the collector current I3 of the parasitic NPN transistor decreases as shown in FIG. 11. Therefore, as shown at t3 and t4 in FIG. 11, the rise of electric potential at the junction point A4 is reduced and large channel current I1 flows in the N-type MOS transistor MN4 as shown immediately after the time t4.

In the meantime, in case the grounded emitter current amplification factor hfe is large, the collector current I3 of the parasitic NPN transistor increases as shown in FIG. 12. Therefore, as shown at t3 and t4 in FIG. 12, the drop of electric potential at the junction point A4 is greatly reduced, compared with the variation shown in FIG. 11 of electric potential at the junction point A4, voltage between the N-type diffused layer 4 (the drain) and the N-type diffused layer 3 (the source) decreases, compared with that in case the grounded emitter current amplification factor hfe is small and channel current I1 which flows immediately after the time t4 in the N-type MOS transistor MN4 decreases.

The grounded emitter current amplification factor hfe greatly varies in the manufacturing process because base width Wb shown in FIG. 10 greatly varies in quantity production and in case the grounded emitter current amplification factor hfe is large, channel current I1 greatly decreases as described above.

As a result, as clear from relation between output voltage VPN and output current respectively shown in FIG. 13 from the negative voltage boosting circuit, a problem that no output current actually flows for the objective value −100 μA of output current when output voltage VPN from the conventional type negative voltage boosting circuit is −10 V occurs.

Therefore, the object of the invention is to provide a negative voltage boosting circuit the boosting efficiency of which is not deteriorated even if a grounded emitter current amplification factor hfe of a parasitic bipolar transistor is large.

Another object of the invention is to provide a negative voltage boosting circuit in which boosting unit circuits for boosting negative voltage are connected in series, the collector current of a bipolar transistor parasitic on a MOS transistor is reduced by connecting bias potential in a channel region of a MOS transistor for switching channel current between the output terminal of a boosting unit circuit and the input terminal of the boosting unit circuit to the output terminal of a boosting unit circuit closer to the output terminal of the negative voltage boosting circuit in place of connecting the above-mentioned bias potential to the drain (the output terminal) in the same channel region and the boosting efficiency is enhanced.

Further another object of the invention is to provide a negative voltage boosting circuit in which in a MOS transistor for transferring charge between an output terminal and an input terminal forming a boosting unit circuit close to the output terminal, applied voltage between each well biased by ground potential and the output terminal of each boosting unit circuit is reduced by turning the electric potential of each well including each channel region of these MOS transistors and forming a pn junction ground potential and which can boost more than withstand voltage even if the withstand voltage between each well including a channel region and forming a pn junction and the output terminal of each boosting unit circuit is short.

BRIEF SUMMARY OF THE INVENTION

Object of the Invention

The object of the invention is to provide a negative voltage boosting circuit the boosting efficiency of which is not deteriorated even if the grounded emitter current amplification factor hfe of a parasitic bipolar transistor is large.

SUMMARY OF THE INVENTION

In a negative voltage boosting circuit in which plural boosting unit circuits each of which includes a MOS transistor for transferring charge one end of the source or the drain of which is connected to an input terminal and the other end of the source or the drain of which is connected to an output terminal for boosting negative voltage are connected in series between the input terminal and the output terminal for generating negative voltage at the output terminal, a well region forming a channel region of the MOS transistor for transferring charge is biased by electric potential at the output terminal of at least a second boosting unit circuit in an output direction.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1:
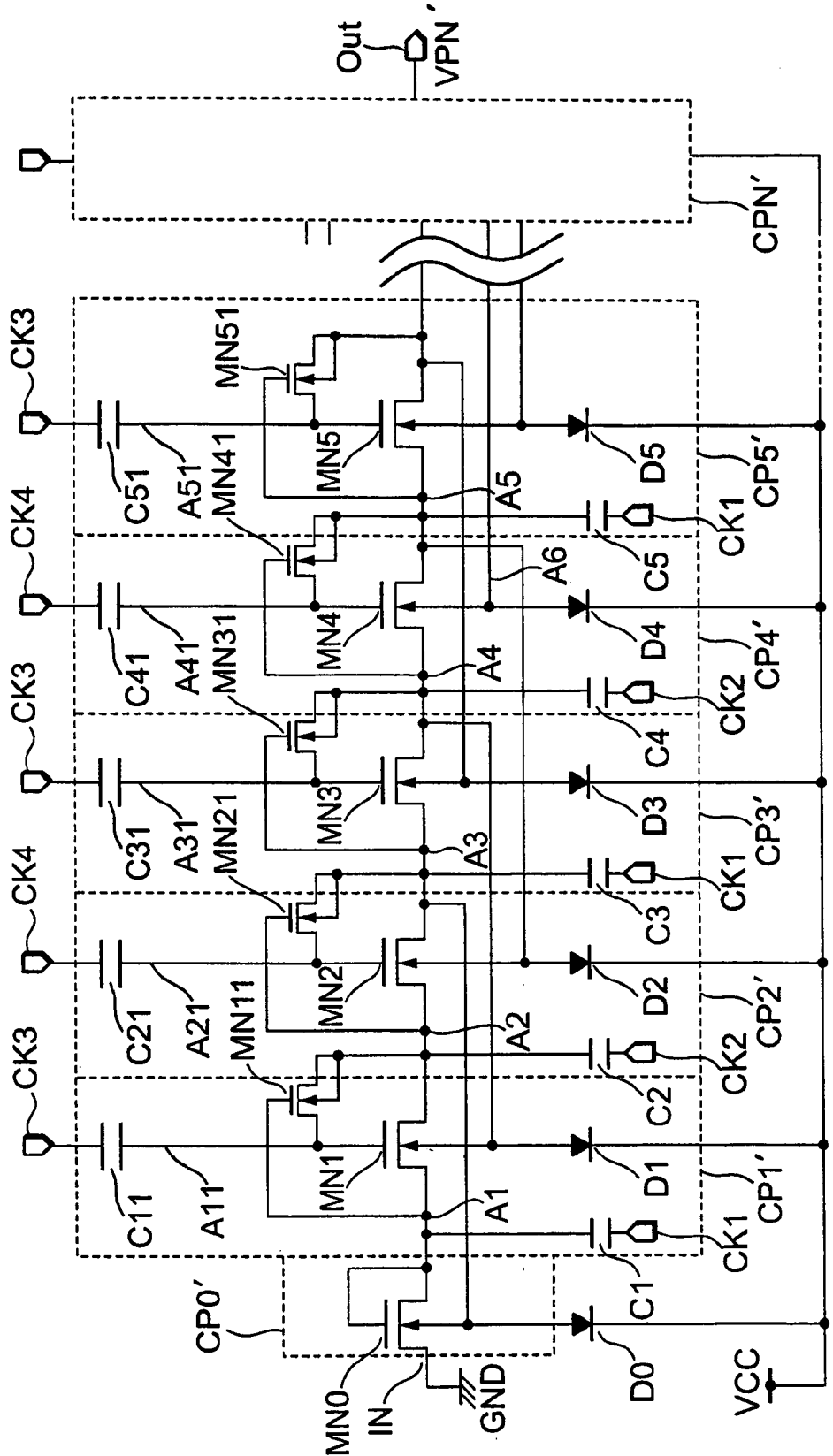
FIG. 1 is a circuit diagram showing a first embodiment of a negative voltage boosting circuit according to the invention.

Next, referring to the drawings, embodiments of the invention will be described.

FIG. 1 is a circuit diagram showing a first embodiment of a negative voltage boosting circuit according to the invention, the negative voltage boosting circuit is formed by a boosting unit circuit CP0' formed by an N-type MOS transistor MN0 the input terminal IN of which is connected to ground potential GND and plural boosting unit circuits CP1' to CP5' (CPN') formed by each combination of N-type MOS transistors MN1 to MN5 and MN11 to MN51 and capacitative elements C1 to C5 and C11 to C51, and generates the output voltage VPN' of the negative voltage boosting circuit at the output terminal Out of the last boosting unit circuit CPN'. A common reference character/number is allocated to a component common to that in FIG. 9.

Figure 9:
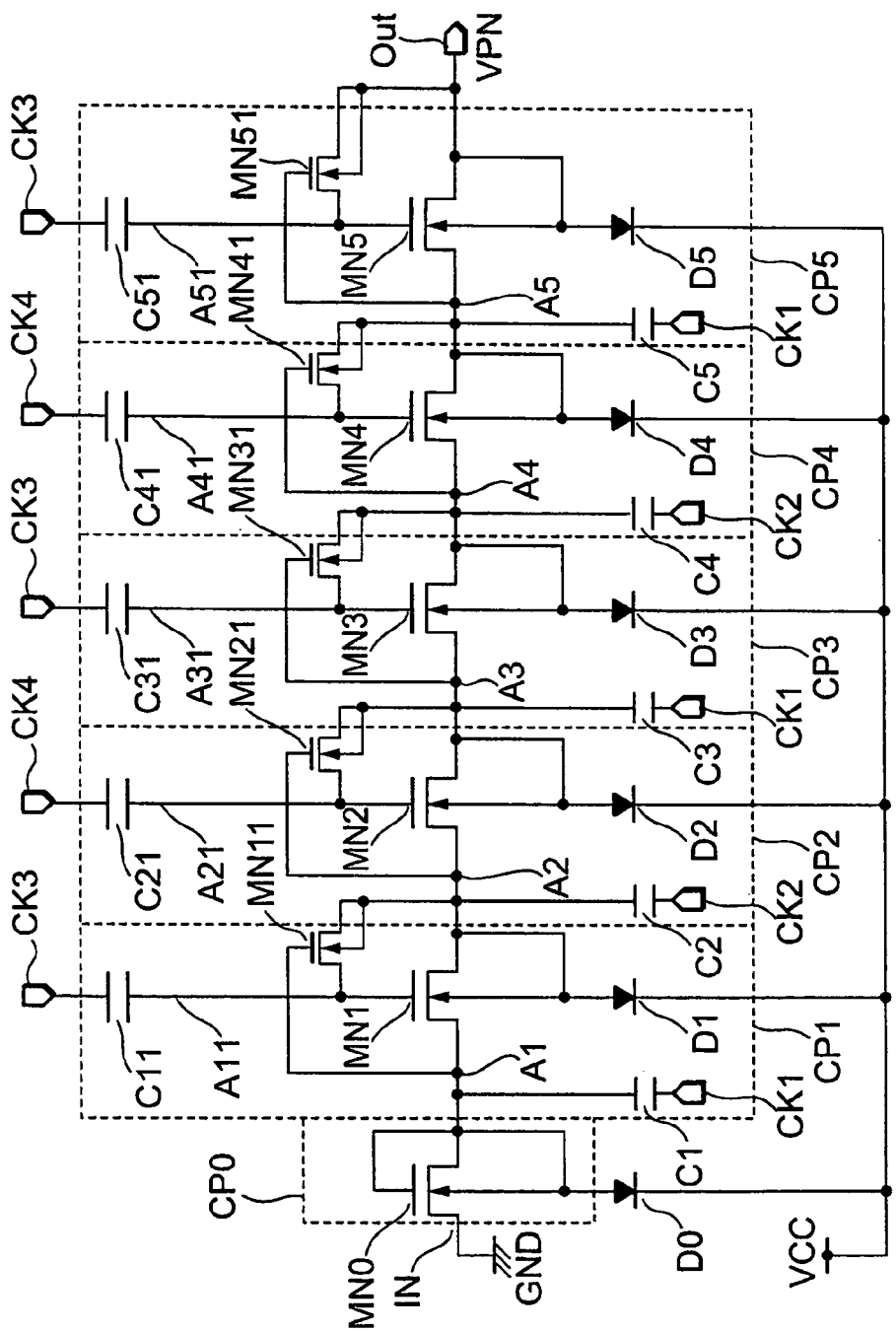
FIG. 9 is a circuit diagram showing a conventional type negative voltage boosting circuit.

The basic circuit configuration and the basic circuit operation of the negative voltage boosting circuit shown in FIG. 1 are similar to those of the negative voltage boosting circuit shown in FIG. 9, however, the negative voltage boosting circuit shown in FIG. 1 is characterized in that a P-type well of the N-type MOS transistors MN0 to MN5 (MNN) is not biased at the output terminal of each boosting unit circuit CP1' to CPN' formed by each N-type MOS transistor MN0 to MNN but is biased at the output terminal of the second boosting unit circuit beyond the current boosting unit circuit in an output direction.

Figure 2:
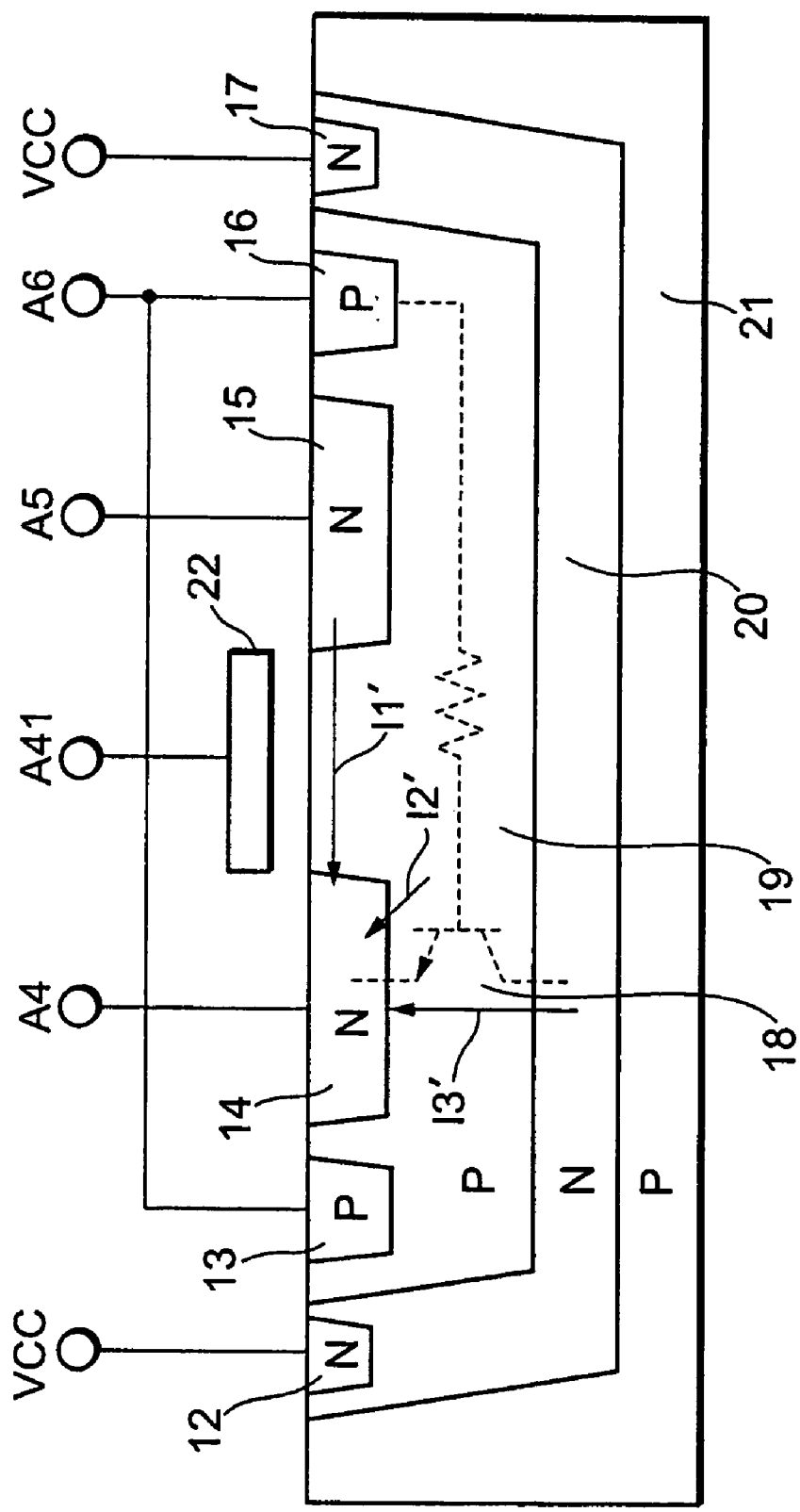
FIG. 2 is a schematic structural sectional view showing an N-type MOS transistor MN4 shown in FIG. 1.

FIG. 2 shows the schematic structural section of the N-type MOS transistor MN4 forming the boosting unit circuit CP4' and also shows the relation of connection among the source terminal A4, the drain terminal A5 and the gate terminal A41 of the N-type MOS transistor MN4, P-type diffused layers 13 and 16 for biasing a P-type well 19 and N-type diffused layers 12 and 17 for biasing an N-type well 20.

Figure 10:
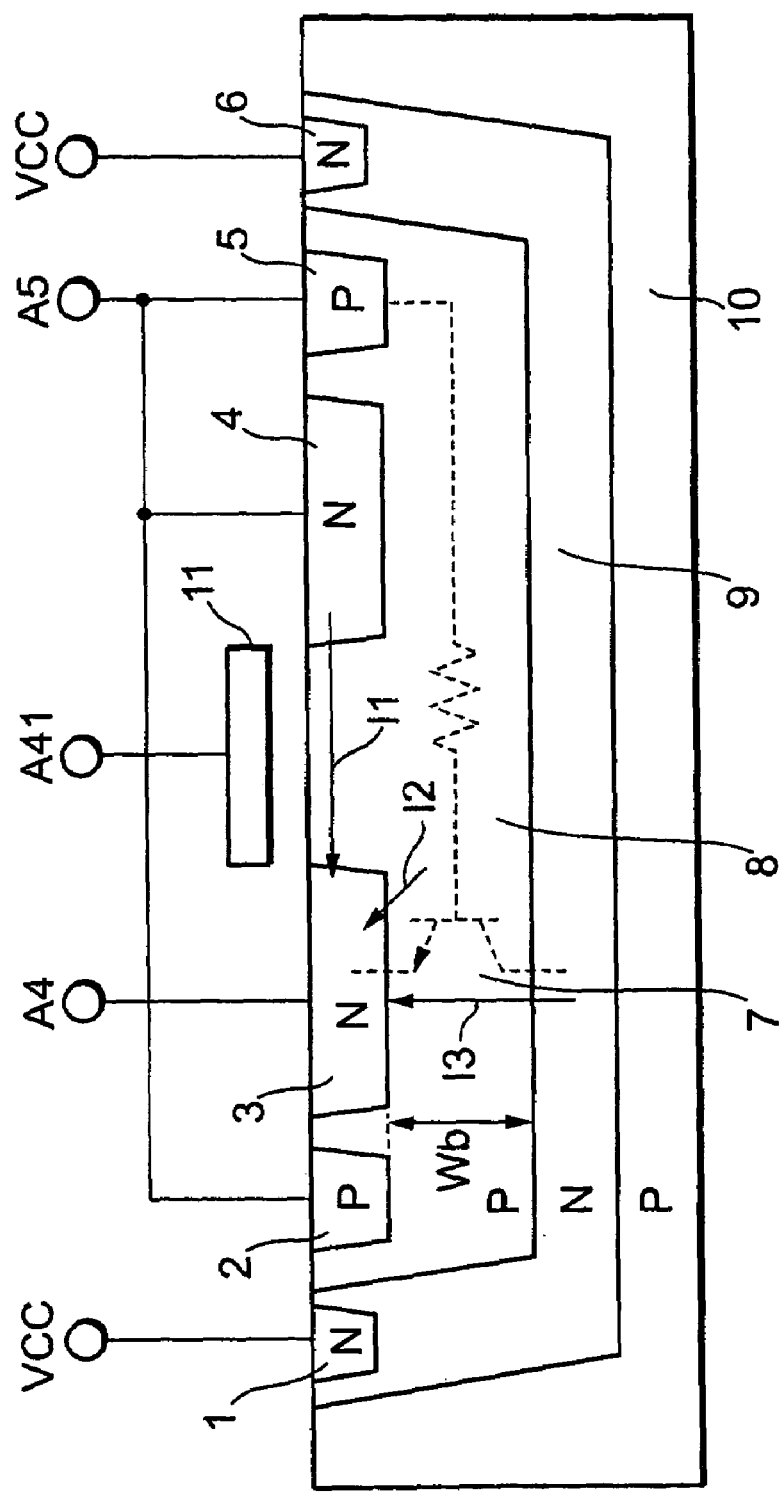
FIG. 10 is a schematic structural sectional view showing an N-type MOS transistor MN4 shown in FIG. 9.

As shown in FIG. 2, the P-type diffused layers 13 and 16 for biasing the P-type well 19 are not connected to the output terminal A5 as shown in FIG. 10, are connected to a junction point A6 connected in common to the output terminal of a second boosting unit circuit CP6' beyond CP4' in the output direction and are biased by electric potential at the output terminal of the second boosting unit circuit CP6'.

From FIG. 1, it is not clear whether the junction point A6 is connected to the output terminal of the second boosting unit circuit CP6' or not, however, the P-type well of each N-type MOS transistor MN0 to MN3 is biased at the output terminal of each second boosting unit circuit in the output direction and this relation is similar in relation to the N-type MOS transistors MN4, MN5 and others.

Next, referring to FIGS. 1 and 2 and signal waveforms shown in FIGS. 11 and 12, the operation of the negative voltage boosting circuit shown in FIG. 1 will be described in behalf of the boosting unit circuit CP4' including the N-type MOS transistor MN4.

Figure 11:
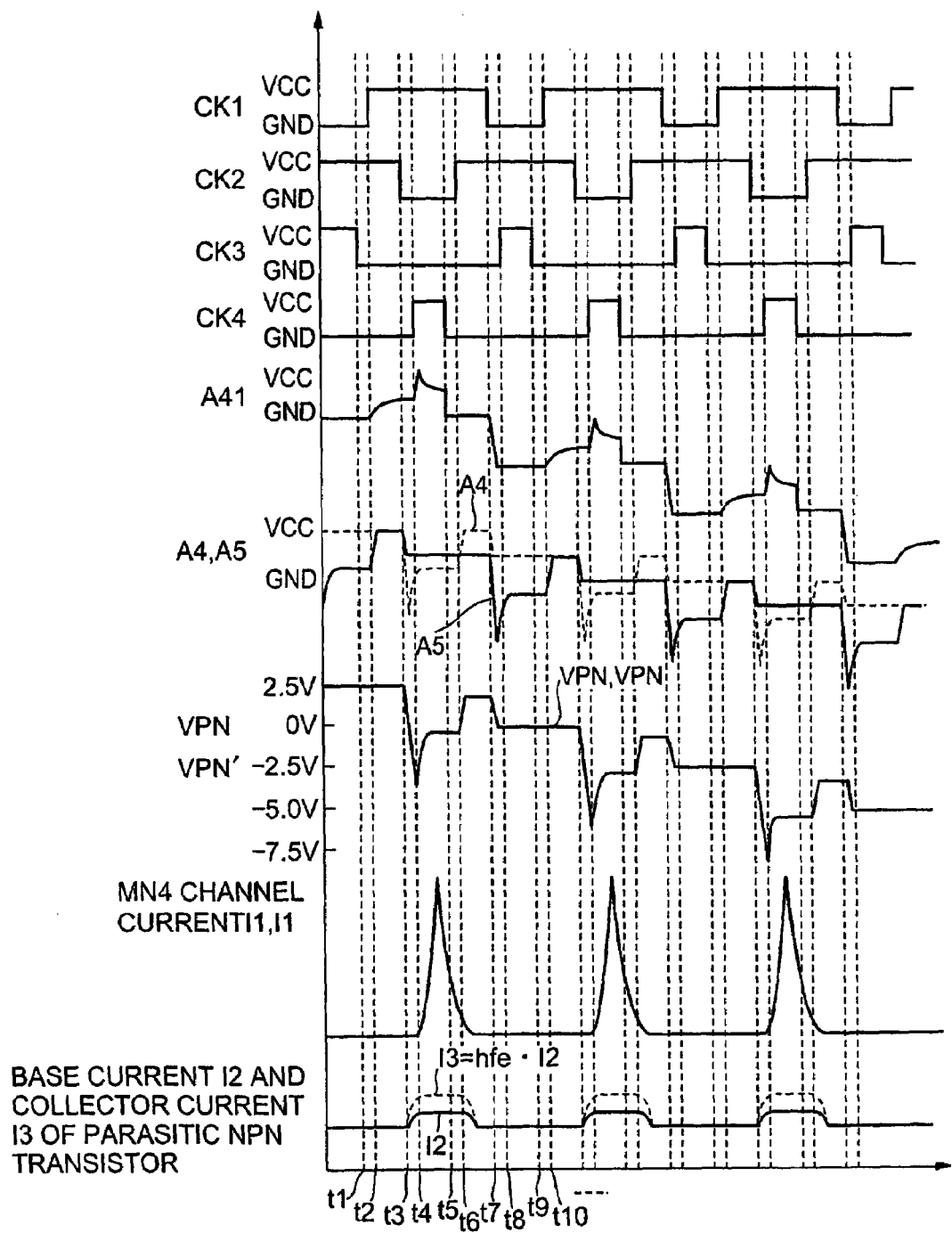
FIG. 11 shows signal waveforms of clock signals for driving the negative voltage boosting circuits shown in FIGS. 1 and 9, the variation of voltage at junction points A4, A5 and A41 and an output terminal Out and the variation of channel current of the N-type MOS transistor MN4 and the current of a parasitic bipolar transistor.

As shown in FIG. 11, before the time t1, a clock signal CK2 is at a VCC level and at this time, electric potential at the junction point A4 is raised up to a level in which the N-type MOS transistor MN41 conducts via the capacitative element C4. When a clock signal CK1 becomes high at time t2, positive pulse current flows to the junction point A5 via the capacitative element C5 and electric potential at the junction point A5 rises. Current flows to the junction point A41 via N-type MOS transistor MN41 and electric potential at the junction point A41 of the gate of the N-type MOS transistor MN4 rises.

Next, a clock signal CK2 becomes low at time t3, negative pulse current flows to the junction point A4 via the capacitative element C4 and electric potential at the junction point A4 drops. At that time, as the P-type well 19 to be a channel region of the N-type MOS transistor MN4 as shown in FIG. 2 is biased by electric potential at the output terminal A6 the electric potential of which is further lower than that of the output terminal A5 via the P-type diffused layers 13 and 16, potential difference between the P-type well 19 which functions as a base of a parasitic NPN transistor and an N-type diffused layer 14 which functions as an emitter is greatly reduced, compared with forward voltage between the emitter and the base of the parasitic NPN transistor shown in FIG. 10 and forward current I2' in a pn junction to be base current of the parasitic NPN transistor hardly flows. Therefore, even if a grounded emitter current amplification factor hfe is high, no current flows to the junction point A4 and electric potential at the junction point A4 can be kept low enough.

Hereby, as voltage between the junction point A4 which functions as a source terminal and the junction point A5 which functions as a drain terminal is greatly increased, compared with that in the conventional type negative voltage boosting circuit shown in FIG. 10, channel current I1' can be increased.

As positive pulse current flows to the gate of the N-type MOS transistor MN4 via the capacitative element C41 when a clock signal CK4 becomes at a high level at the time t4 afterward, the gate potential of the N-type MOS transistor MN4 further rises, the N-type MOS transistor MN4 conducts enough, large channel current I1' can flow from the junction point A5 to the junction point A4 and charge is efficiently transmitted. When this operation is sequentially repeated in each boosting unit circuit CP0' to CP5', the potential of output voltage VPN' from the output terminal Out drops for example every cycle of a clock signal as shown in FIG. 11 and after predetermined time, the potential becomes negative fixed potential (−13 V in this embodiment).

Figure 12:
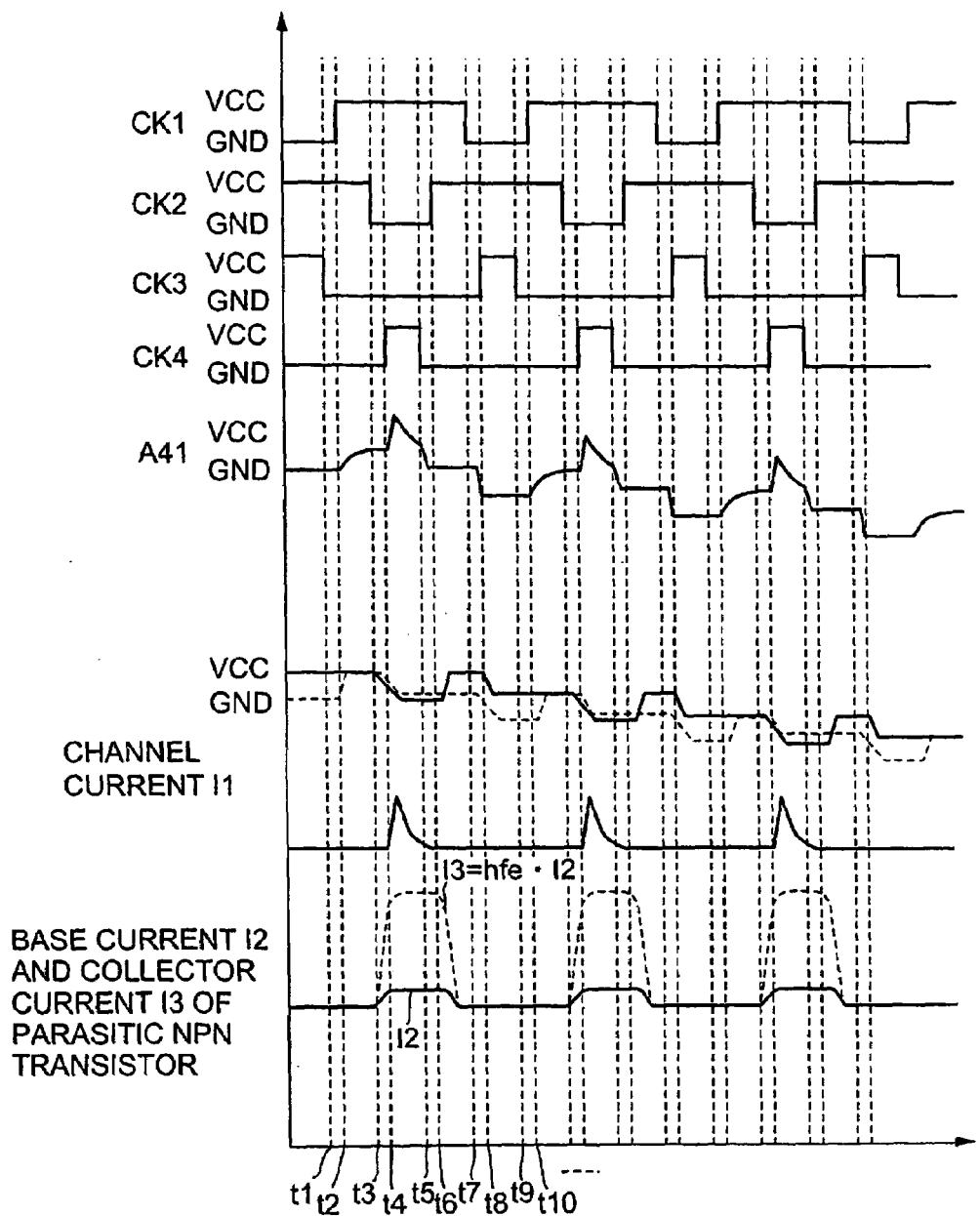
FIG. 12 shows signal waveforms of voltage at the junction point of the conventional type negative voltage boosting circuit shown in FIG. 9, channel current of the MOS transistor for transferring charge, the base current and the collector current of a parasitic NPN transistor.

As described above, in the negative voltage boosting circuit shown in FIG. 1, as voltage between the source and the drain of each N-type MOS transistor MN0 to MN5 becomes high enough by biasing each P-type well to be a channel region of the N-type MOS transistors MN0 to MN5 by electric potential at the output terminal of the second boosting unit circuit connected in series in the output direction which is a direction in which electric potential drops and forward voltage between the emitter and the base of the parasitic NPN transistor having each P-type well as a base is greatly reduced, large collector current I3 shown in FIG. 12 does not flow even if the grounded emitter current amplification factor hfe is high. Therefore, even if the grounded emitter current amplification factor hfe is high, the channel current I1' of the N-type MOS transistor MN4 can be increased as shown in FIG. 11.

Therefore, in the negative voltage boosting circuit according to the invention, the deterioration of boosting efficiency by the parasitic bipolar transistor can be greatly improved.

Figure 3:
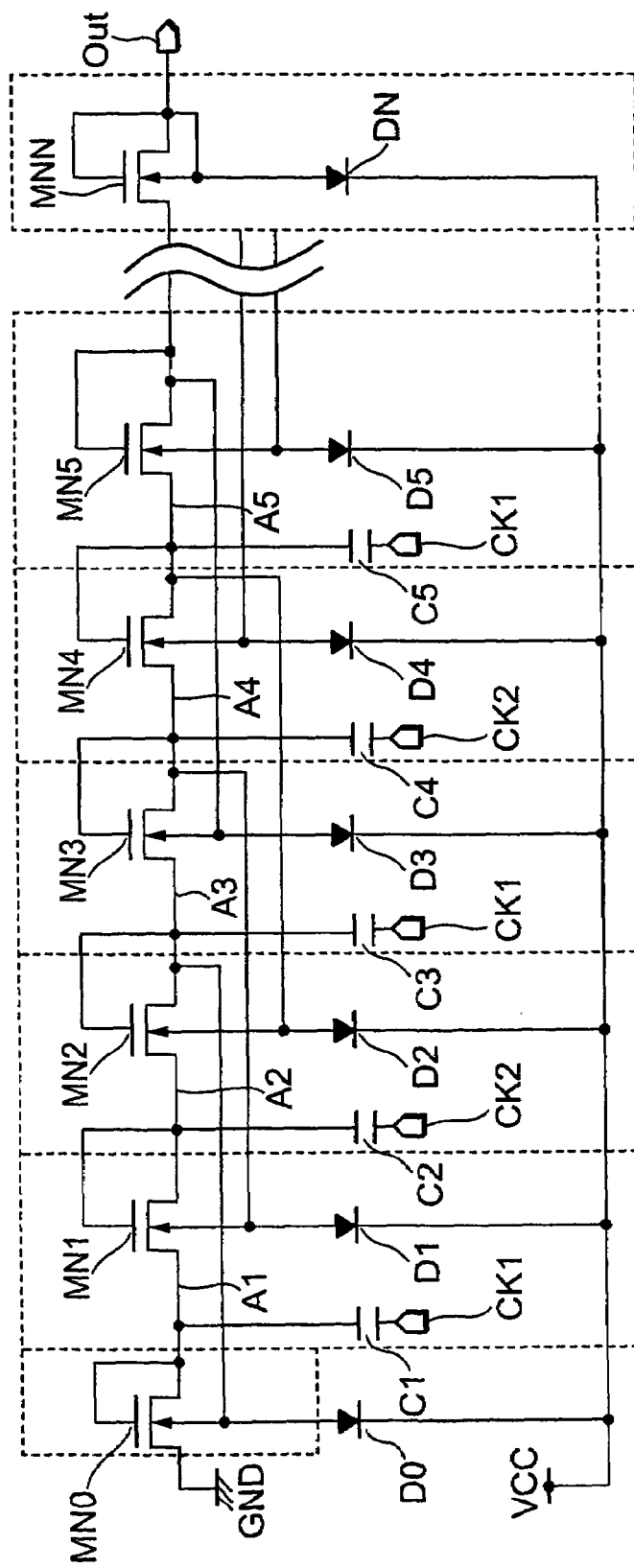
FIG. 3 is a circuit diagram showing a second embodiment of the negative voltage boosting circuit according to the invention.
Figure 4:
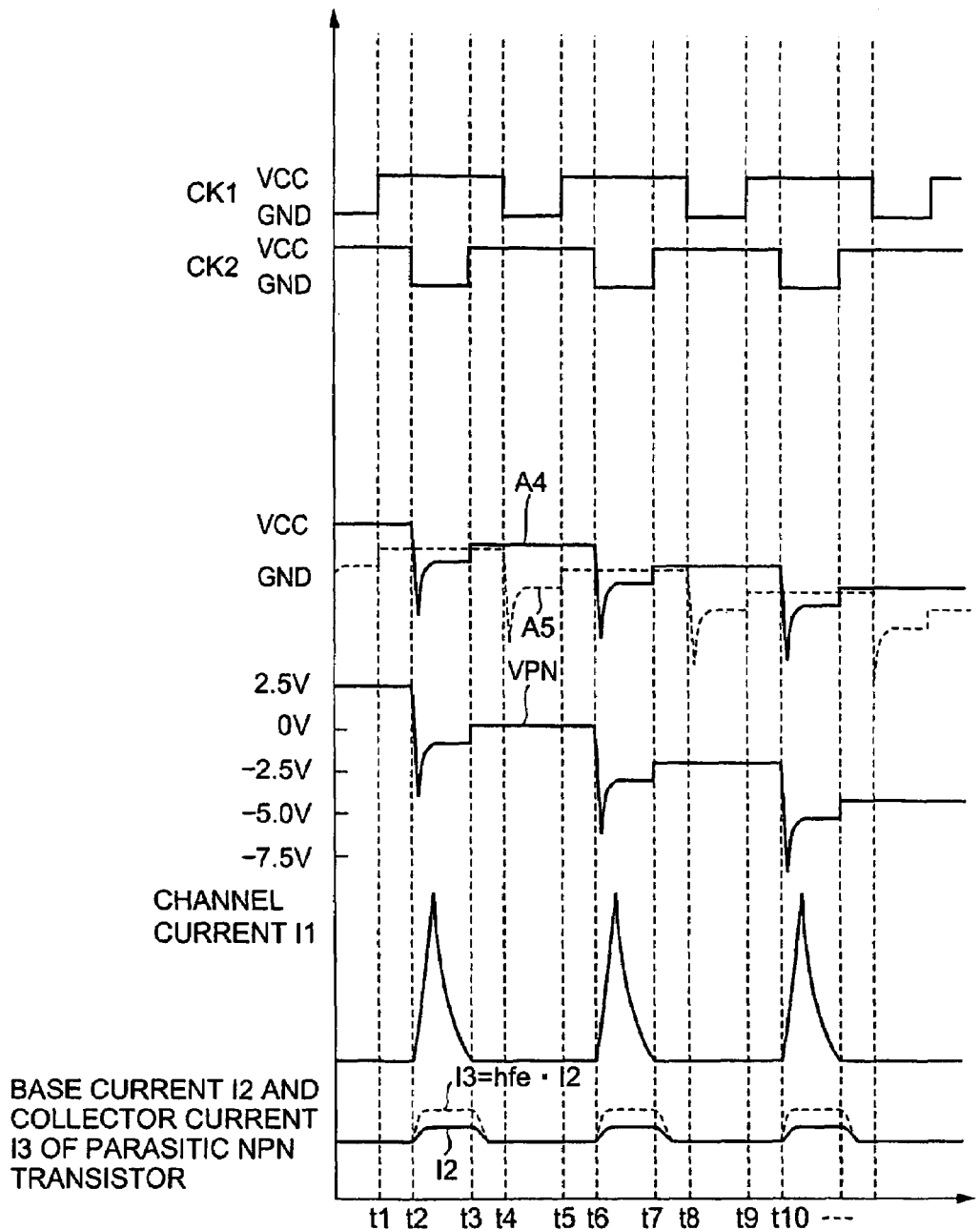
FIG. 4 shows input waveforms of clock signals CK1 and CK2 applied to the negative voltage boosting circuit shown in FIG. 3, voltage waveforms and current waveforms at each junction point.

Next, a second embodiment of the negative voltage boosting circuit according to the invention will be described. FIG. 3 is a circuit diagram showing a negative voltage boosting circuit equivalent to the second embodiment of the invention and FIG. 4 shows the input waveforms of clock signals CK1 and CK2 applied to the negative voltage boosting circuit shown in FIG. 3, voltage at each junction point and current waveforms.

The negative voltage boosting circuit shown in FIG. 3 is characterized in that the number of elements is small, compared with that in the negative voltage boosting circuit shown in FIG. 1 and the area on a semiconductor substrate is small.

In the negative voltage boosting circuit equivalent to this embodiment, voltage between the source and the drain of an N-type MOS transistor for transferring charge can be also made high enough by biasing each P-type well to be a channel region of N-type MOS transistors MN0 to MN5 by electric potential at the output terminal of a second boosting unit circuit connected in series in an output direction which is a direction in which electric potential drops and forward voltage between the emitter and the base of a parasitic NPN transistor having each P-type well as a base is greatly reduced, large collector current I3 does not flow even if a grounded emitter current amplification factor hfe is high.

Therefore, in the negative voltage boosting circuit equivalent to this embodiment, the deterioration of boosting efficiency by the parasitic bipolar transistor can be greatly improved.

Next, referring to a circuit diagram shown in FIG. 5, a third embodiment of the negative voltage boosting circuit according to the invention will be described.

Figure 5:
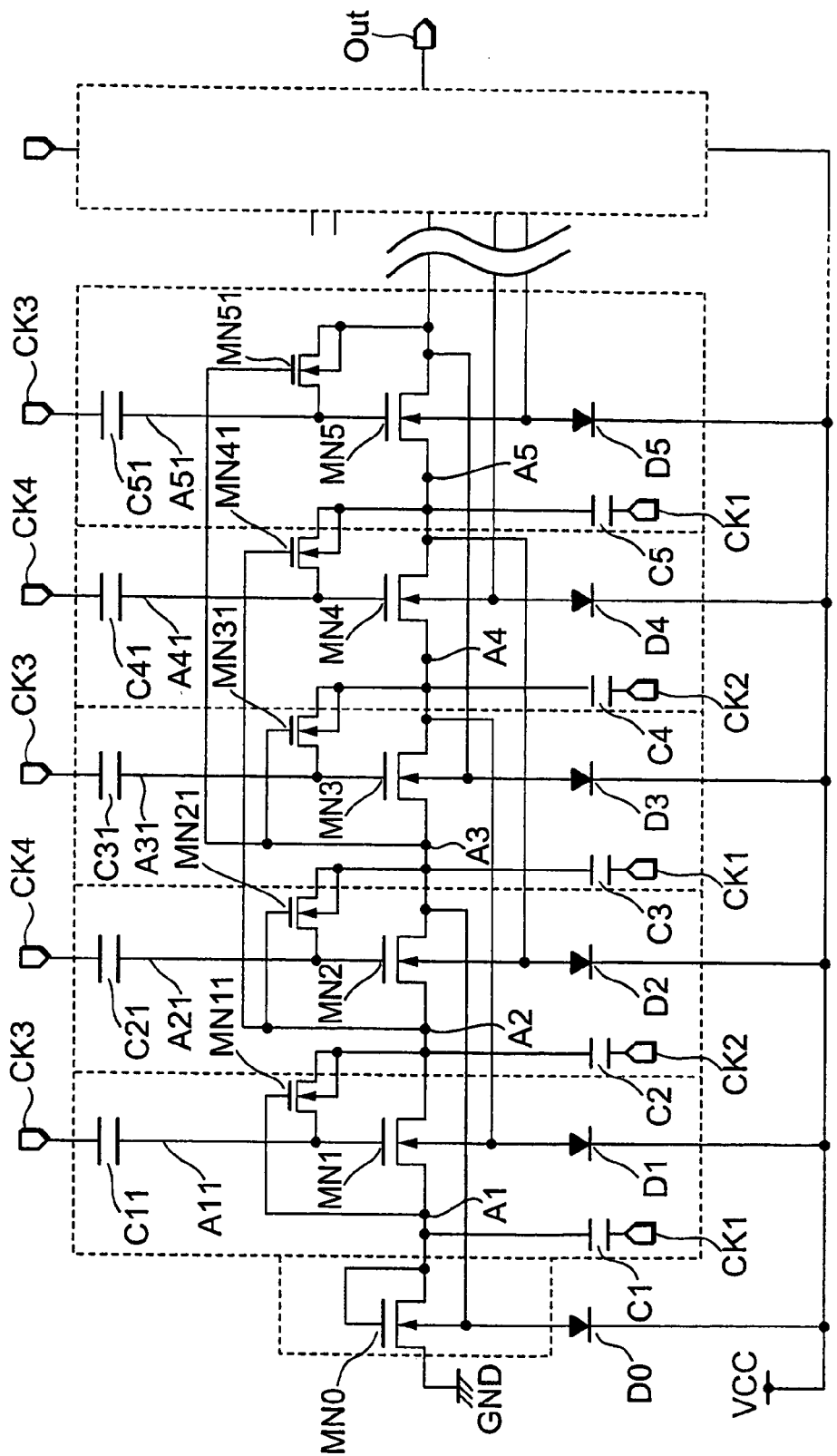
FIG. 5 is a circuit diagram showing a third embodiment of the negative voltage boosting circuit according to the invention.

In a negative voltage boosting circuit equivalent to this embodiment, as clear from the connection of each gate of N-type MOS transistors MN41, MN51 and others shown in FIG. 5, the ON-state resistance of an N-type MOS transistor MNi1 is reduced by biasing the gate of the N-type MOS transistor MNi1 for increasing the gate voltage of an N-type MOS transistor MNi (i=4, 5, - - - ) for transferring charge by electric potential at the input terminal of a second boosting unit circuit connected in series in an input direction which is a direction in which electric potential rises.

Therefore, current which flows via the N-type MOS transistor MNi1 raises electric potential at the gate of the N-type MOS transistor MNi for transferring charge, voltage between the source and the gate of the N-type MOS transistor MNi is increased and channel current can be increased.

Therefore, the negative voltage boosting circuit equivalent to this embodiment can compensate the rise of the threshold of the N-type MOS transistor MNi by the back gate bias effect and boosting efficiency can be improved.

Figure 6:
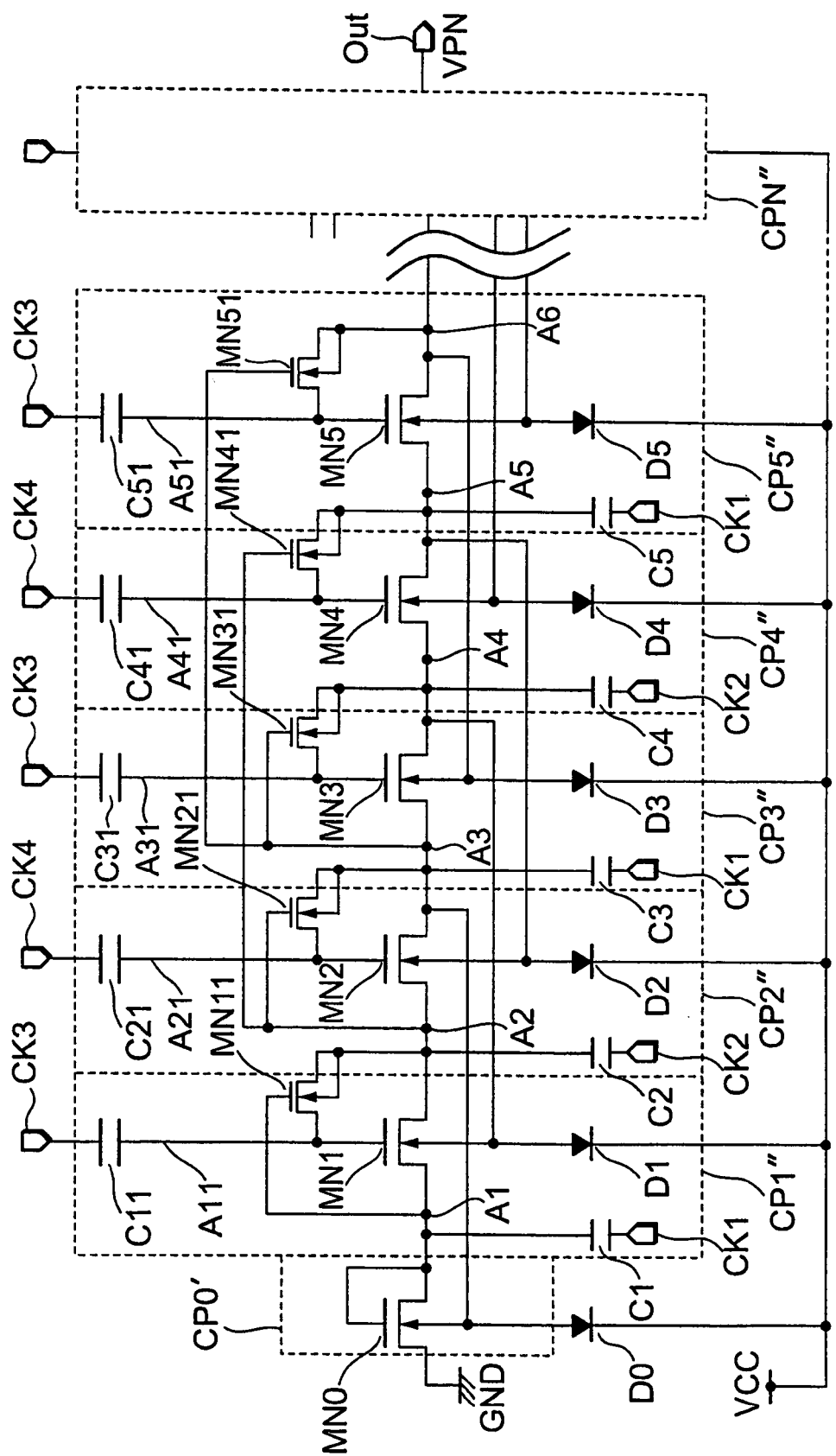
FIG. 6 is a circuit diagram showing a fourth embodiment of the negative voltage boosting circuit according to the invention.

Next, referring to a circuit diagram shown in FIG. 6, a fourth embodiment of the negative voltage boosting circuit according to the invention will be described.

A negative voltage boosting circuit equivalent to this embodiment is characterized in that an N-type well which forms a pn junction together with a P-type well to be a channel region of an N-type MOS transistor for transferring charge MNj (j=3, 4, - - - ) and which is formed so that the N-type well contains the P-type well is biased by ground potential GND.

The structural section of the N-type MOS transistor for transferring charge MNj forming a boosting unit circuit is similar to that in FIG. 2 except the relation of connection, however, in this embodiment, N-type diffused layers 12 and 17 for biasing the N-type well 20 shown in FIG. 2 are biased by ground potential GND.

Therefore, voltage between the N-type well 20 and an N-type diffused layer 14 greatly decreases, compared with a case that the N-type well 20 is biased by power supply voltage VCC. Therefore, even if withstand voltage between the N-type well 20 and the N-type diffused layer 14 is smaller than boosting voltage, a junction by a P-type well 19 and the N-type well 20 is yielded by voltage applied between the N-type well 20 and the N-type diffused layer 14, current always flows from the N-type well 20 to the N-type diffused layer 14, the electric potential of the N-type diffused layer 14 is raised and boosting efficiency can be prevented from being deteriorated. That is, the negative voltage boosting circuit equivalent to this embodiment is characterized in that even if withstand voltage between the N-type well 20 and the N-type diffused layer 14 is small, higher negative voltage can be generated.

The above-mentioned withstand voltage between the N-type well 20 and the N-type diffused layer 14 is defined as withstand voltage LVce between the emitter and the collector of a parasitic NPN transistor composed of the N-type well 20 which functions as the collector, the P-type well 19 which functions as a base and the N-type diffused layer 14 which functions as the emitter and as the withstand voltage LVce between the emitter and the collector greatly drops when the withstand voltage between the emitter and the collector is lower than withstand voltage between the base and the collector and a grounded emitter current amplification factor hfe is large, this embodiment is extremely effective in case boosting voltage is high.

It is for the following reason that in the above description, each N-type well of all N-type MOS transistors for transferring charge MN0, MN1, - - - is not biased by ground potential GND and each N-type well of the N-type MOS transistors MN3, MN4, - - - is biased by ground potential GND.

That is, if each N-type well of all N-type MOS transistors MN0, MN1, - - - is biased by ground potential GND, a boundary between the P-type well and the N-type well of the N-type MOS transistors MN0, MN1, - - - connected to junction points A1, A2, - - - of all the N-type MOS transistors for transferring charge MN0, MN1, - - - is forward-biased at a first stage of boosting, positive pulse current which flows at the output terminal of boosting unit circuits via capacitative elements C1, C2, - - - for boosting leaks from the P-type well toward the N-type well, flows as current and a problem that electric potential at the input terminal of the boosting unit circuit is not raised and boosting is impossible or boosting efficiency is deteriorated occurs. Therefore, each N-type well of the N-type MOS transistors for transferring charge forming a few boosting unit circuits on the input side is connected to power supply voltage VCC as in the negative voltage boosting circuits shown in FIGS. 1, 3 and 5.

The selection of biasing the N-type well of the N-type MOS transistor for transferring charge forming the above-mentioned boosting unit circuit by power supply voltage VCC or biasing by ground potential GND will be described below.

First, the selection will be described under a prerequisite that withstand voltage between the collector and the emitter of the above-mentioned parasitic NPN transistor is high enough, all N-type wells which function as the collector are connected to power supply voltage VCC, output voltage VPN' is generated at the output terminal Out of the negative voltage boosting circuit, N pieces of boosting unit circuits are provided and voltage between the input terminal and the output terminal of each boosting unit circuit is equal in all the boosting unit circuits.

Electric potential of each P-type well equivalent to the P-type well 19 shown in FIG. 2 varies at the leading edge and at the trailing edge of a clock signal CK1 via the capacitative elements for boosting C1, C2, - - - , however, the maximum potential of each P-type well is based upon power supply voltage VCC when a clock signal CK1 becomes at a high level.

The maximum potential VBmax of the P-type well of the N-type MOS transistor for transferring charge forming a Kth (K=1, 2, - - - ) boosting unit circuit can be expressed by the following expression (1) based upon the above review.

$$VBmax(K)=VCC+(VPN'/N)\times(K+3) \quad (1)$$

When VBmax (K) expressed in the expression (1) has a positive value, an N-type well, for example in FIG. 2, the N-type well 20 and the P-type well 19 are forward-biased if the N-type well is biased by ground potential GND, and as current to flow from the P-type diffused layers 13 and 16 to the N-type diffused layer 14 leaks and flows from the P-type diffused layers 13 and 16 to the N-type well 20 and boosting efficiency is remarkably deteriorated, the N-type well of the N-type MOS transistor for transferring charge forming the boosting unit circuit is biased by power supply voltage VCC in case VBmax (K) is positive.

As described above, the N-type well 20 and the P-type well 19 can be always biased in reverse directions by biasing the N-type well of the N-type MOS transistor by power supply voltage VCC and current can be prevented from flowing from the P-type diffused layers 13 and 16 to the N-type diffused layer 14.

In the meantime, as the N-type well and the P-type well are always biased in reverse directions even if the N-type well of the N-type MOS transistor for transferring charge forming the boosting unit circuit is biased by ground potential GND in case VBmax (K) expressed in the expression (1) has a negative value, the N-type well of the N-type MOS transistor for transferring charge forming the boosting unit circuit can be biased by ground potential GND.

The above description can be summarized as follows.

If VBmax (K)≧0 V, the N-type well of the N-type MOS transistor for transferring charge forming the boosting unit circuit is connected to VCC.

If VBmax (K)<0 V, the N-type well of the N-type MOS transistor for transferring charge forming the boosting unit circuit is connected to GND.

Figure 7:
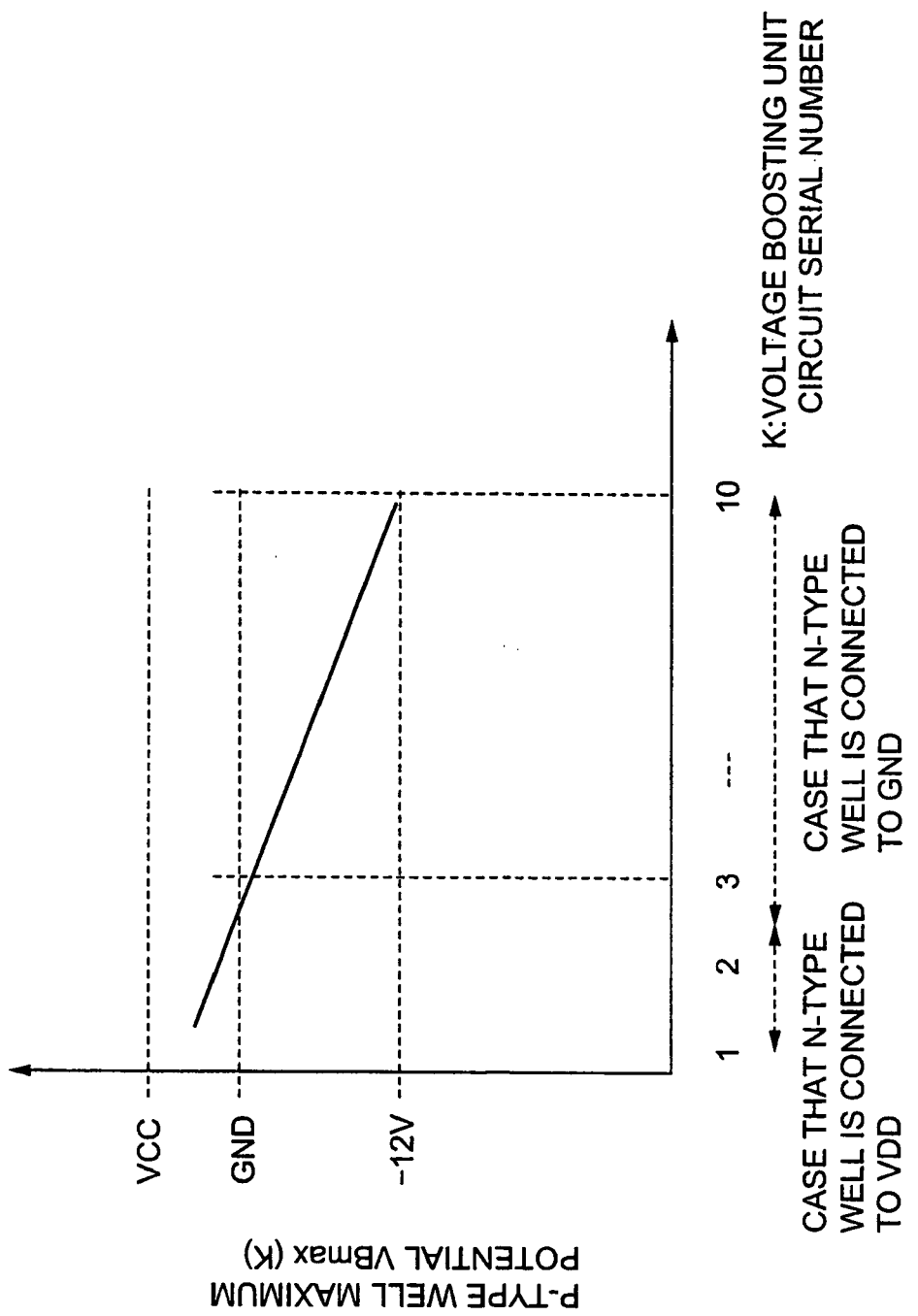
FIG. 7 shows relation between serial numbers of boosting unit circuits and the maximum potential VBmax (K) of a P-type well in the negative voltage boosting circuit according to the invention.

FIG. 7 shows serial numbers K denoting the order of boosting unit circuits on the horizontal axis and the maximum potential VBmax (K) of the P-type well on the vertical axis, referring to the expression (1). A boosting unit circuit CP1" next to a boosting unit circuit CP0" connected to an input terminal IN has a serial number of 1 and serial numbers are implemented by one in a direction of an output terminal. As a first term in the expression (1) has a positive value and VPN' in a second term has a negative value, VBmax (K) decreases as a serial number K becomes large.

In the case of FIG. 7, each N-type well of N-type MOS transistors for transferring charge forming boosting unit circuits CP4", CP5", - - - after a boosting unit circuit CP3" having a serial number of 3 is biased by ground potential GND and each N-type well of N-type MOS transistors for transferring charge forming boosting unit circuits CP0" to CP2" closer to the side of the input terminal than these boosting unit circuits is biased by power supply voltage VCC.

Voltage between the N-type well and the N-type diffused layer is greatly reduced by changing bias to the N-type well of the N-type MOS transistor for transferring charge forming the boosting unit circuit depending upon a value of VBmax (K) expressed in the expression (1) as described above, compared with a case that the N-type well is biased by power supply voltage VCC, even if withstand voltage between the N-type well and the N-type diffused layer is small, higher negative voltage can be generated and even if positive pulse current flows to the output terminal A1, A2, - - - of each boosting unit circuit via capacitative elements for boosting C1, C2, - - - , the P-type well and the N-type well respectively forming all boosting unit circuits are not forward-biased and current never leaks to the N-type well. Therefore, electric potential at each junction point A1, A2, - - - never drops by leakage current to the N-type well.

Figure 8:
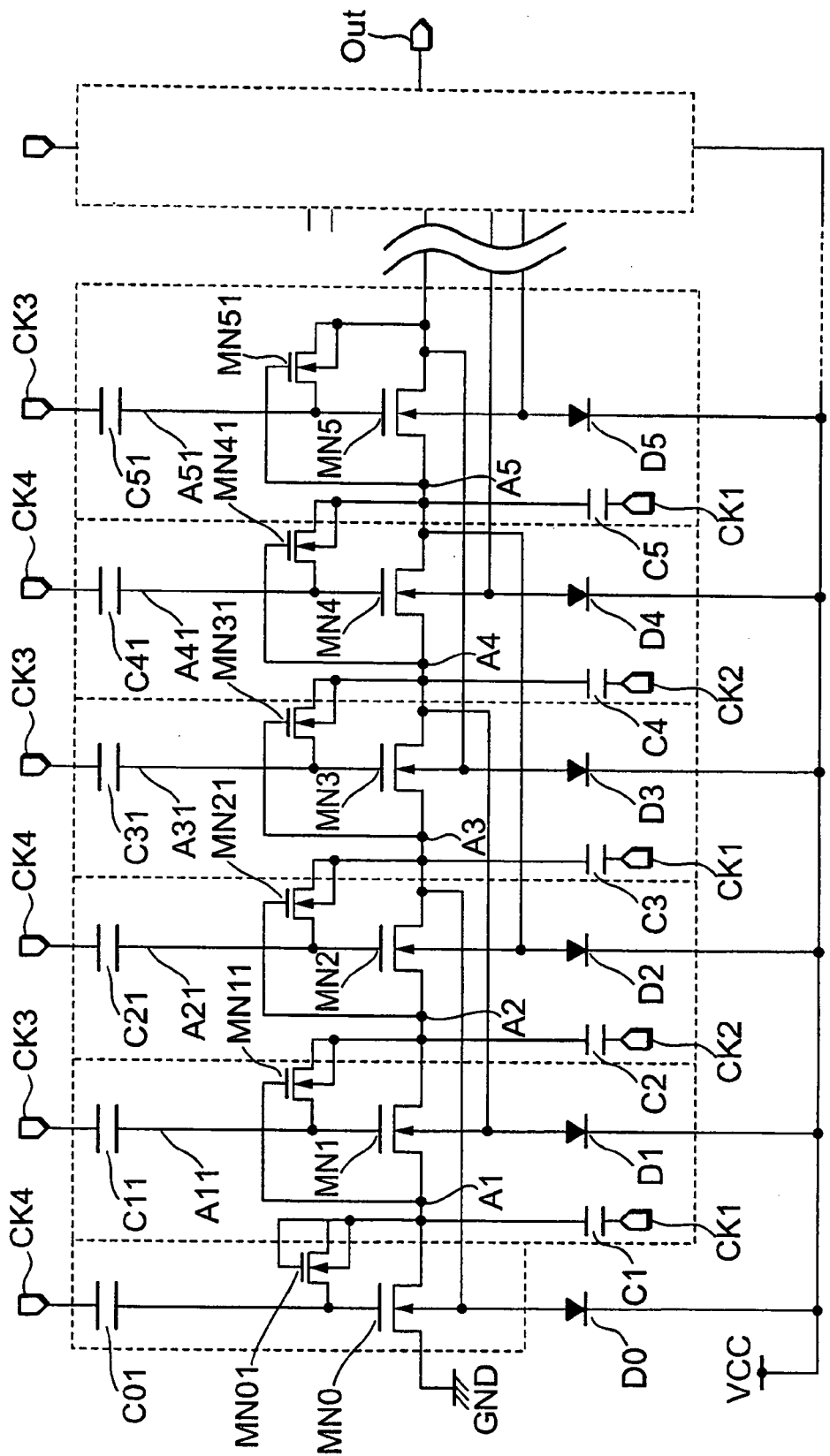
FIG. 8 is a circuit diagram showing a fifth embodiment of the negative voltage boosting circuit according to the invention.

Next, referring to a circuit diagram shown in FIG. 8, a fifth embodiment of the negative voltage boosting circuit according to the invention will be described.

In a negative voltage boosting circuit equivalent to this embodiment, an N-type MOS transistor MN01 and a capacitative element C01 are added to a boosting unit circuit CP0' which is equivalent to an input part of the negative voltage boosting circuit shown in FIG. 1, the source of the N-type MOS transistor MN01 is connected to one end of the capacitative element C01 and the gate of an N-type MOS transistor MN0, and the gate and the drain of the N-type MOS transistor MN01, a P-type well to its own channel region and the drain of the N-type MOS transistor MN0 are connected to an output terminal in common.

A clock signal CK4 is input to the other end of the capacitative element C01. Hereby, the gate potential of the N-type MOS transistor MN0 can be more raised and boosting efficiency is further improved.

In the above-mentioned embodiments, it is described that each P-type well to be a channel region of the N-type MOS transistors for transferring charge MN0 to MN5, - - - forming boosting unit circuits is biased by electric potential at the output terminal of the second boosting unit circuit connected in series in the output direction which is the direction in which electric potential decreases, however, the invention is not limited to the second boosting unit circuit in the output direction and in case each P-type well is biased by electric potential at the output terminal of an "m"th (m: 3 or more integer) boosting unit circuit, the similar effect is also acquired.

In the third embodiment, it is described that the gate of the N-type MOS transistor MNi1 for increasing the gate voltage of the N-type MOS transistor for transferring charge MNi (i=4, 5, - - - ) is biased by electric potential at the input terminal of the second boosting unit circuit connected in series in the input direction which is the direction in which electric potential rises, however, the invention is not limited to the second boosting unit circuit and in case each P-type well is biased by electric potential at the output terminal of an "m"th (m: 3 or more integer) boosting unit circuit, the similar effect is also acquired.

Also, in the third embodiment, it is described that each N-type well of the N-type MOS transistors for transferring charge forming the boosting unit circuits CP4", CP5", - - - after the boosting unit circuit CP3" having the serial number of 3 is biased by ground potential GND and each N-type well of the N-type MOS transistors for transferring charge forming the boosting unit circuits CP0" to CP2" closer to the side of the input terminal than these boosting unit circuits is biased by power supply voltage VCC, however, more generally, each N-type well may be also connected to a first bias source in place of power supply voltage VCC and may be also connected to a second bias source the voltage of which is lower than the voltage of the first bias source in place of ground potential GND.

As described above, the boosting efficiency of the negative voltage boosting circuit according to the invention is never deteriorated even if the grounded emitter current amplification factor hfe of the parasitic bipolar transistor is large.

In the negative voltage boosting circuit according to the invention, voltage between the N-type well and the N-type diffused layer respectively having the P-type well between them greatly decreases by biasing each N-type well of the N-type MOS transistors for transferring charge forming the boosting unit circuits close to the output terminal by ground potential GND, compared with the case that each N-type well is biased by power supply voltage. Therefore, even if withstand voltage between the N-type well and the N-type diffused layer is smaller than boosting voltage, the junction by the P-type well and the N-type well is yielded by voltage applied between the N-type well and the N-type diffused layer, current always flows from the N-type well to the N-type diffused layer, the electric potential of the N-type diffused layer is raised and boosting efficiency can be prevented from being deteriorated. Therefore, even if withstand voltage between the N-type well and the N-type diffused layer is small, higher negative voltage can be generated.

Figure 13:
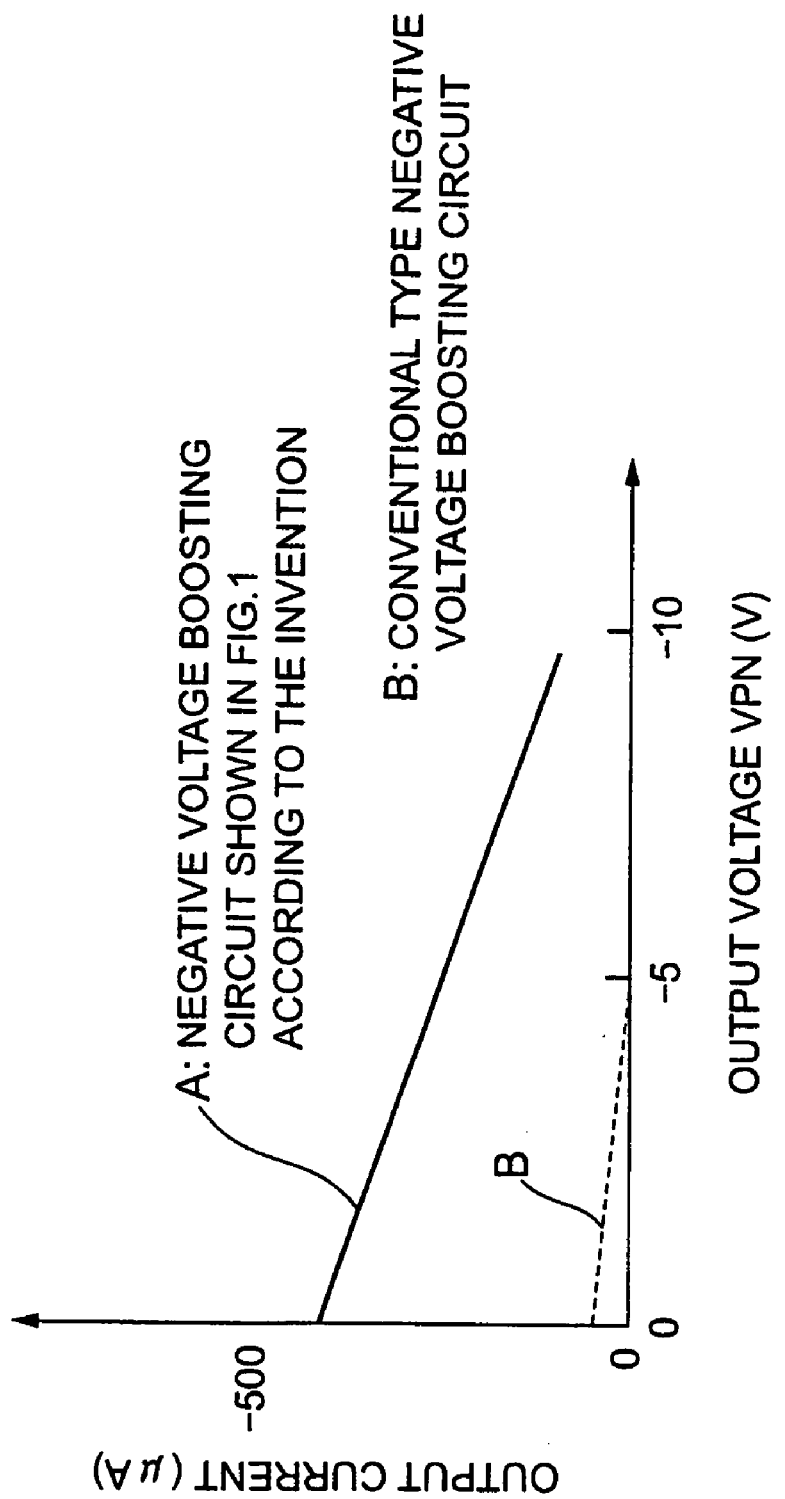
FIG. 13 shows relation between the output voltage VPN and the output current of each negative voltage boosting circuit shown in FIGS. 1 and 9.

To concretely explain the effect of the negative voltage boosting circuit according to the invention referring to FIG. 13, graphs shown by A and B in FIG. 13 show relation between output voltage and output current in the conventional type negative voltage boosting circuit and the negative voltage boosting circuit according to the invention when 20 boosting unit circuits are provided, VCC is 2.2 V (the central condition of VCC is 2.5 V and 2.2 V is a minimum value), the temperature of the junction is 150° C. which is the maximum temperature, the mutual conductance of the MOS transistor is set to a lowest value, the grounded emitter current amplification factor hfe of the NPN transistor parasitic on the N-type MOS transistor is 16 which is an actually measured value and a clock frequency is 20 MHz.

In the conventional type negative voltage boosting circuit shown by B, output current when output voltage is −10 V does not flow at all, however, in the negative voltage boosting circuit according to the invention shown by A and shown in FIG. 1, when output voltage is −10 V, current can be output by −116 µA and the performance is particularly enhanced, compared with that of the conventional type negative voltage boosting circuit.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A negative voltage boosting circuit comprising:
at least five boosting unit circuits, each including a MOS transistor for transferring charge, the source or the drain of which is connected to an input terminal of the boosting unit circuit and the other of the source or drain of which is connected to an output terminal of the boosting unit circuit,
wherein the boosting unit circuits are connected in series between an input terminal of the negative voltage boosting circuit and an output terminal of the negative voltage boosting circuit for generating negative voltage at the output terminal,
wherein a well region forming a channel region of the MOS transistor for one boosting unit circuit for transferring charge, is biased by electric potential at the output terminal of another boosting unit circuit in an output direction, and wherein:
at least one boosting unit circuit connected in series after a fourth boosting unit circuit in an output direction from a first boosting unit circuit connected to the input terminal of the negative voltage boosting circuit comprises:
a first capacitative element to one end of which a first clock signal is applied and the other end of which is connected to the gate of the MOS transistor for transferring charge of the at least one boosting unit circuit;
a second capacitative element to one end of which a second clock signal is applied and the other end of which is connected to the input terminal of the at least one boosting unit circuit; and
a second MOS transistor the gate of which is connected to the input terminal of the second boosting unit circuit in an input direction, the source of which is connected to the gate of the MOS transistor for transferring charge of the at least one boosting unit circuit and the drain of which is connected to the output terminal of the at least one boosting unit circuit.

2. A negative voltage boosting circuit comprising:

at least two boosting unit circuits, each including a MOS transistor for transferring charge, either the source or the drain of which is connected to an input terminal of the boosting unit circuit and the other of the source or drain is connected to an output terminal of the boosting unit circuit, wherein the boosting unit circuits are connected in series between an input terminal and an output terminal of the negative voltage boosting circuit for generating negative voltage at the output terminal, and wherein a well region forming a channel region of the MOS transistor which transfers charge, for at least one boosting unit circuit, is biased by electric potential at the output terminal of another boosting unit circuit located in an output direction from the biased boosting unit circuit, further comprising:

a second MOS transistor the source of which is connected to the gate of the MOS transistor for transferring charge of a first boosting unit circuit, the gate and the drain of which are connected to the output terminal of the first boosting unit circuit, wherein the first boosting unit circuit is connected to the input terminal of the negative voltage boosting circuit and provided with a capacitative element to one end of which a clock signal is applied and the other end of which is connected to the gate of the MOS transistor for transferring charge of the first boosting unit circuit.

3. A negative voltage boosting circuit comprising:

at least n, n≧3, first MOS transistors coupled in series between an input node and an output node of said negative voltage boosting circuit, each of said first MOS transistors having a well region forming a channel region; and a plurality of capacitors, each of said capacitors coupled to an associated one of each of said first MOS transistors, wherein each well region of each (n–2) first MOS transistor is respectively coupled to an associated output node of only one first MOS transistor located in an output direction from each (n–2) first MOS transistor wherein the gate of each said first MOS transistor is coupled to the associated output node of said first MOS transistor, and each well region is coupled to a different associated output node.

4. The circuit as claimed in claim 3, further comprising:

a plurality of second MOS transistors, each of said second MOS transistors is coupled between the gate and the associated output node of said respective first MOS transistor.

5. A negative voltage boosting circuit comprising:

a first transistor coupled between an input node and a first node, and said first transistor having a first gate driven by a first clock signal;

a second transistor coupled between said first node and a second node, and said second transistor having a second gate driven by a second clock signal;

a third transistor coupled between said second node and an output node, and said third transistor having a third gate driven by said first clock signal; and a well region forming a channel region of said first transistor connected to said output node, wherein an input transistor coupled between an input terminal of said negative voltage circuit and said input node, said input transistor having a well region coupled to said second node.

6. The circuit as claimed in claim 5, further comprising;

a first capacitor coupled between said first gate of said first transistor and a first clock supplying terminal supplying said first clock signal;

a second capacitor coupled between said second gate of said second transistor and a second clock supplying terminal supplying said second clock signal; and a third capacitor coupled between said third gate of said third transistor and said first clock supplying terminal.

7. The circuit as claimed in claim 5, further comprising:

a diode coupled between said well region and a first voltage supply terminal.

8. A negative voltage boosting circuit comprising:

a first transistor coupled between an input node and a first node, and said first transistor having a first gate driven by a first clock signal;

a second transistor coupled between said first node and a second node, and said second transistor having a second gate driven by a second clock signal;

a third transistor coupled between said second node and an output node, and said third transistor having a third gate driven by said first clock signal; and a well region forming a channel region of said first transistor connected to said output node, further comprising:

a fourth transistor coupled between said first gate and said first node, and said fourth transistor having a fourth gate coupled to said input node;

a fifth transistor coupled between said second gate and said second node, and said fifth transistor having a fifth gate coupled to said first node; and a sixth transistor coupled between said third gate and said output node, and said sixth transistor having a sixth gate coupled to said second node.

9. A voltage generating circuit comprising:

a first MOS transistor formed in a first well region and coupled between an input node and a first node, and said first MOS transistor having a gate terminal receiving a first clock signal having a first clock phase;

a second MOS transistor formed in a second well region and coupled between said first node and a second node, and said second MOS transistor having a gate terminal receiving a second clock signal having a second clock phase being different from said first clock phase;

a third MOS transistor formed in a third well region and coupled between said second node and a third node, and said third MOS transistor having a gate terminal receiving said first clock signal; and a fourth MOS transistor formed in a fourth well region and coupled between said third node and an output node, and said fourth MOS transistor having a gate terminal receiving said second clock signal; and said first well region of said first transistor being electrically coupled to said third node, and said second well region of said second transistor being electrically coupled to said output node.

10. The circuit as claimed in claim 9, further comprising;

a first capacitor coupled between said first node and a fourth node;

a second capacitor coupled between said second node and a fifth node; and a third capacitor coupled between said third node and a sixth node.

11. The circuit as claimed in claim 10, wherein said fourth node receives a third clock signal having a third clock phase, said fifth node receives a fourth signal having a fourth clock phase being different from said third clock phase, and said sixth node receives a said third clock signal.

12. The circuit as claimed in claim 9, further comprising:
a fifth MOS transistor coupled between said first node and said gate of said first transistor, and having a gate terminal coupled to said input node;
a sixth MOS transistor coupled between said second node and said gate of said second transistor, and having a gate electrode coupled to said first node;
a seventh MOS transistor coupled between said third node and said gate of said third transistor, and having a gate electrode coupled to said second node; and
an eighth MOS transistor coupled between said output node and said gate of said fourth transistor, and having a gate electrode coupled to said third node.

13. The circuit as claimed in claim 12, further comprising;
a first capacitor coupled to said gate of said first transistor, and said first clock signal being supplied to said gate of said first transistor via said first capacitor;
a second capacitor coupled to said gate of said second transistor, and said second clock signal being supplied to said gate of said second transistor via said second capacitor;
a third capacitor coupled to said gate of said third transistor, and said first clock signal being supplied to said gate of said third transistor via said third capacitor; and
a fourth capacitor coupled to said gate of said fourth transistor, and said second clock signal being supplied to said gate of said fourth transistor via said fourth capacitor.

14. A voltage generating circuit comprising:
a first MOS transistor formed in a first well region and coupled between an input node and a first node receiving a first clock signal having a first clock phase;
a second MOS transistor formed in a second well region and coupled between said first node and a second node receiving a second clock signal having a second clock phase different from said first clock phase;
a third MOS transistor coupled between said second node and a third node receiving said first clock phase;
a fourth MOS transistor coupled between said third node and a fourth node receiving said second clock phase;
a fifth MOS transistor coupled between said fourth node and an output node;
said first well region of said first transistor being electrically coupled to said third node, and said second well region of said second transistor electrically coupled to said fourth node.

* * * * *